(12) United States Patent
Dinerstein et al.

(10) Patent No.: US 11,115,586 B2
(45) Date of Patent: Sep. 7, 2021

(54) SYSTEMS AND METHODS FOR COVERTLY MONITORING AN ENVIRONMENT

(71) Applicant: WildTech@Resolve, LLC, Washington, DC (US)

(72) Inventors: Eric Dinerstein, Cabin John, MD (US); Stephen Craig Gulick, Syracuse, NY (US)

(73) Assignee: WILDTECH@RESOLVE, LLC, Washington, DC (US)

( * ) Notice: Subject to any disclaimer, the term of this patent is extended or adjusted under 35 U.S.C. 154(b) by 46 days.

(21) Appl. No.: 16/450,039

(22) Filed: Jun. 24, 2019

(65) Prior Publication Data

US 2019/0394392 A1    Dec. 26, 2019

Related U.S. Application Data

(60) Provisional application No. 62/689,556, filed on Jun. 25, 2018.

(51) Int. Cl.
| | | |
|---|---|---|
| *H04N 5/232* | (2006.01) | |
| *H04N 5/225* | (2006.01) | |
| *H04N 5/33* | (2006.01) | |
| *G06K 9/00* | (2006.01) | |
| *H04N 7/18* | (2006.01) | |

(52) U.S. Cl.
CPC ..... *H04N 5/23219* (2013.01); *G06K 9/00671* (2013.01); *H04N 5/2252* (2013.01); *H04N 5/332* (2013.01); *H04N 7/188* (2013.01); *G06K 2209/21* (2013.01)

(58) Field of Classification Search
CPC .. H04N 5/23219; H04N 5/2252; H04N 5/332; H04N 7/188; G06K 9/00671; G06K 2209/21

USPC ........................................................ 348/151
See application file for complete search history.

(56) References Cited

U.S. PATENT DOCUMENTS

| | | | |
|---|---|---|---|
| 6,449,431 B1 | 9/2002 | Cuddeback et al. | |
| 7,471,334 B1 | 12/2008 | Stenger | |
| 7,848,637 B1 | 12/2010 | Liew | |
| 8,837,928 B1 | 9/2014 | Clearman et al. | |
| 2007/0019941 A1 | 1/2007 | Cross et al. | |
| 2011/0242315 A1 | 10/2011 | Barley et al. | |
| 2014/0092299 A1* | 4/2014 | Phillips | F16M 11/10 348/376 |
| 2014/0354821 A1 | 12/2014 | Monroe | |
| 2016/0277688 A1* | 9/2016 | Gaskamp | H04N 5/23206 |

FOREIGN PATENT DOCUMENTS

WO    2014144628 A2    9/2014

* cited by examiner

*Primary Examiner* — On S Mung
(74) *Attorney, Agent, or Firm* — DLA Piper LLP (US)

(57) ABSTRACT

Systems and methods are provided for covertly monitoring an environment. In addition, solutions are provided for utilizing a camera to covertly monitor an environment by capturing images of a subject without the subject's awareness. In accordance with some embodiments, a system for capturing images is provided that comprises a device, a first cable, and a second cable. The device may comprise a housing having a top and a bottom, and a circuit board disposed within the housing. The first cable is may be connected to the circuit board and may extend through the top of the housing. The second cable may be connected to the circuit board and may extend through the bottom of the housing.

20 Claims, 7 Drawing Sheets

SYSTEMS AND METHODS FOR COVERTLY MONITORING AN ENVIRONMENT

CROSS-REFERENCE TO RELATED APPLICATION

This application claims priority to and the benefit of U.S. Provisional Application 62/689,556 titled "Systems and Methods for Covertly Monitoring an Environment," filed on Jun. 25, 2018, the disclosure of which is incorporated herein by reference in its entirety.

BACKGROUND

Camera devices have been designed to capture images of animals in the wild. For example, devices called camera traps have been equipped with sensors that automatically capture an image when motion is detected. Camera traps have been used by researchers to capture images of animals when the researchers are not present. Camera traps are also used to capture images of animals for other purposes, such as hunting, wildlife viewing, and photography.

SUMMARY

Embodiments of the present disclosure relate to systems and methods for covertly monitoring an environment. In addition, embodiments of the present disclosure relate to solutions that utilize a camera to covertly monitor an environment by capturing one or more images of a subject without the subject's awareness.

In accordance with some embodiments of the present disclosure, there is provided a system for capturing images, comprising a device, a first cable, and a second cable. The device comprises a housing having a top, a bottom, a front, a rear, and two sides, the housing having a greater length from the top to the bottom than from the front to the rear or between the two sides. The device also comprises a motion detector disposed within the housing, a camera disposed within the housing, a circuit board disposed within the housing, a memory disposed within the housing storing instructions, and a processor disposed within the housing configured to execute the instructions. The first cable is connected to the circuit board and extends through the top of the housing. The second cable is connected to the circuit board and extends through the bottom of the housing.

In accordance with aspects of the disclosure, the system further comprises a transmission unit connected to the circuit board via the first cable, and a battery connected to the circuit board via the second cable.

In accordance with further aspects of the disclosure, at least one of the first cable or the second cable is coated with a material and colored to mimic a vine.

In accordance with still further aspects of the disclosure, the device is no greater than 0.75 inches wide, is no greater than 0.75 inches deep, and is no greater than 4.25 inches in height.

In accordance with aspects of the disclosure, the camera is configured to capture an image when motion is detected in a field of view of the motion detector, the instructions stored in the memory include image recognition software, and the processor is configured to execute the instructions to process the image and identify whether a subject appears in the image.

In accordance with further aspects of the disclosure, the camera is configured to capture an image when motion is detected in a field of view of the motion detector, and the instructions stored in the memory include image recognition software. The processor is further configured to execute the instructions to process the image and identify whether a subject appears in the image, transmit data to the transmission unit over the cable when the subject is identified as appearing in the image, and cause the transmission unit to transmit the data to a server over a network.

In accordance with still further aspects of the disclosure, the data includes the image.

In accordance with aspects of the disclosure, the data includes an alert.

In accordance with further aspects of the disclosure, the subject is one of a human, an animal of a particular species, or a vehicle.

In accordance with still further aspects of the disclosure, the processor is further configured to execute the instructions to wake from a power-saving sleep mode when the motion is detected.

In accordance with aspects of the disclosure, the processor is further configured to execute the instructions to return to the power-saving sleep mode when the transmission unit has transmitted the data.

In accordance with further aspects of the disclosure, the data includes information regarding at least one of a time that the image was captured, a date that the image was captured, a location at which the image was captured, or a direction in which the subject was moving.

In accordance with still further aspects of the disclosure, the data is transmitted over a Global System for Mobile (GSM) communication network, a network that uses Long Range (LoRa) digital wireless communication technology, or a satellite network.

In accordance with aspects of the disclosure, the motion detector is a passive infrared (PIR) motion detector.

In accordance with further aspects of the disclosure, the device further comprises an ambient light sensor disposed within the housing, and an infrared illuminator disposed within the housing.

In accordance with still further aspects of the disclosure, the infrared illuminator illuminates an environment with electromagnetic radiation having a wavelength in the near-infrared spectrum between 850 and 950 nanometers.

In accordance with aspects of the disclosure, the server provides the data for display on a screen associated with at least one member of a response team.

Furthermore, in accordance with some embodiments, there is provided a method for capturing images. The method includes detecting, by a motion detector disposed within a housing having a top, a bottom, a front, a rear, and two sides, the housing having a greater length from the top to the bottom than from the front to the rear or between the two sides, motion in a field of view of the motion detector. The method further includes capturing, by a camera disposed within the housing, an image when the motion detector detects the motion. The method still further includes processing, by a processor disposed within the housing, the image to identify whether a subject appears in the image.

In accordance with aspects of the disclosure, the method further comprises transmitting, by the processor, data to a transmission unit over a first cable when the subject appears in the image, the first cable extending outside of the housing and being coated with a material and colored to mimic a vine.

In accordance with further aspects of the disclosure, the data includes the image.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

DETAILED DESCRIPTION OF EXAMPLE EMBODIMENTS

Figure 1:
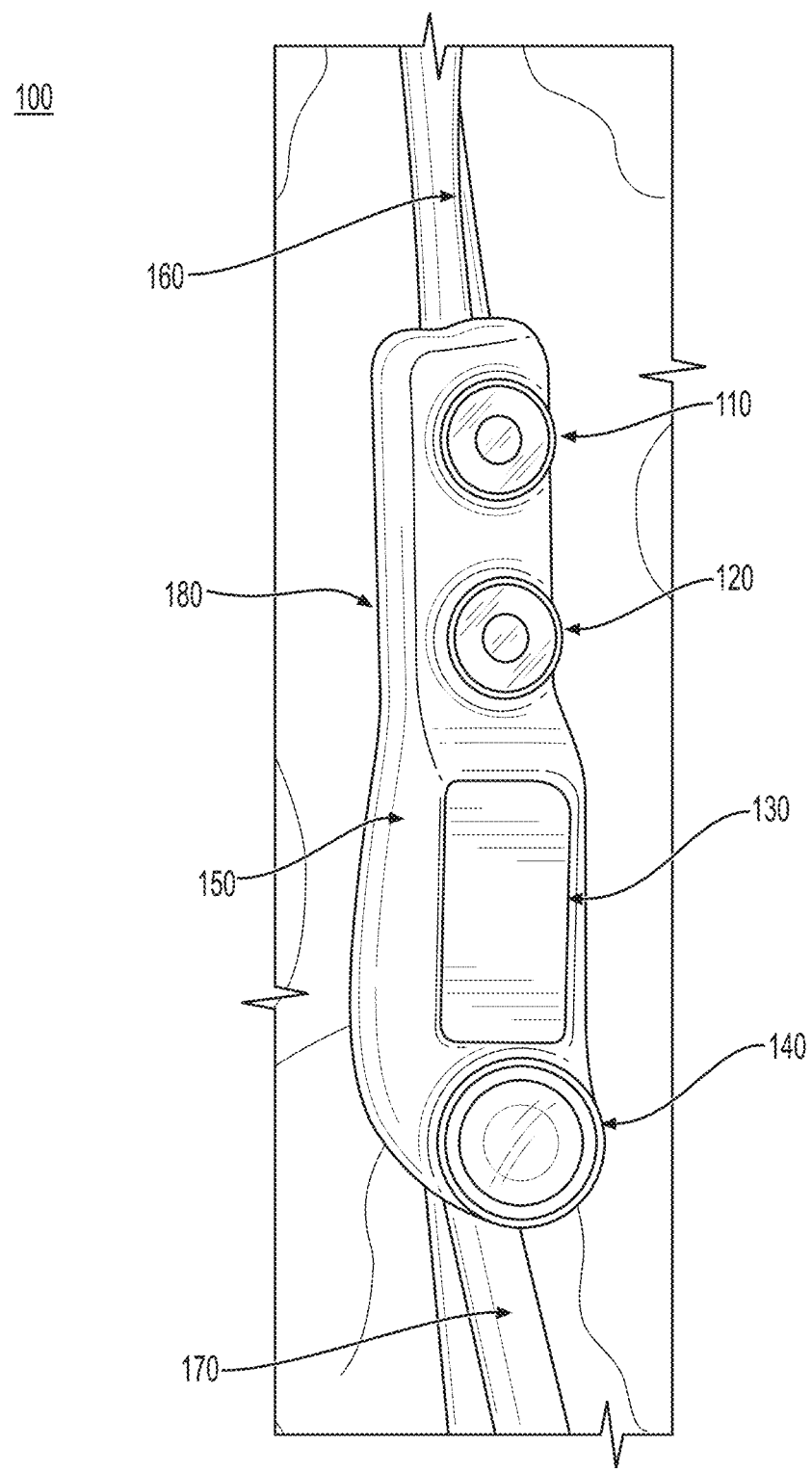
FIG. 1 illustrates an example view of a system for capturing images according to some embodiments of the present disclosure.

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments of the present disclosure relate to systems and methods for covertly monitoring an environment. In addition, embodiments of the present disclosure relate to solutions that utilize a camera to covertly monitor an environment by capturing one or more images of a subject without the subject's awareness.

People can pose risks to animals. For example, wildlife poaching in Africa is reaching epidemic proportions and placing iconic animal species at risk of extinction in the near future. Attempts have been made to remedy this issue. Such attempts have included, for example, deploying law enforcement officers to patrol areas of national parks to look for signs of poaching. However, such attempts are expensive and law enforcement officers are unable to effectively monitor the vast tracts of land where the issues exist. Additionally, poachers are aware of efforts to thwart their plans, and avoid areas known to be patrolled or where footprints, broken branches, or other signs of human activity are evident.

Animals can also pose risks to people. For example, villagers in Africa and Asia experience attacks by wild animals to themselves or their livestock. Such attacks often cause villagers to retaliate by killing the animal, which further adds to the risk of extinction of the animal species. Attempts have been made to remedy this issue. Such attempts have included, for example, placing radio collars on animals such as lions to track the animals and identify whether they are encroaching on a village. However, collaring wild animals is challenging and expensive. Additionally, risks remain that animals without collars, such as a new lion pride, could move into an area and pose new risks to a village.

Camera devices have been designed to capture images of animals in the wild. For example, devices called camera traps have been equipped with sensors that automatically capture an image when motion is detected. Camera traps have been used by researchers to capture images of animals when the researchers are not present. Camera traps are also used to capture images of animals for other purposes, such as hunting, wildlife viewing, and photography. Camera traps could be used in attempts to identify humans or animals in an attempt to mitigate conflict between the humans and animals. However, camera traps are expensive. Camera traps are also relatively large in size, making them obvious to poachers or animals. Poachers and animals might then avoid the camera traps or destroy them. Camera traps also have relatively low battery life. Regularly changing batteries of camera traps in the field presents dangers to the individuals servicing the traps, as the individuals may encounter wild animals or poachers while in the field. Regularly servicing the camera traps may also make locations of camera traps more apparent, as footprints or broken branches may lead poachers to camera trap locations. Camera traps are also incapable of issuing alerts from remote locations quick enough for law enforcement to address issues. For example, a camera trap may store images on a card within the trap, requiring an individual to go into the field to retrieve the card. Camera traps with wireless capabilities may be capable of transmitting an image over a standard cellular network. However, cellular network coverage in areas where conflict between humans and animals exists, such as in national parks in Africa, is often unreliable or nonexistent.

Embodiments of the present disclosure can address the challenges associated with monitoring areas where conflict between humans and animals is prevalent. Embodiments of the present disclosure can also address the shortcomings of camera traps. Embodiments of the present disclosure provide systems and methods for covertly monitoring an environment. For example, embodiments of the present disclosure provide systems and methods that can covertly monitor an environment by capturing one or more images of a subject without the subject's awareness. The systems may, for example, include a device comprising a housing having a top, a bottom, a front, a rear, and two sides. The device may include in the housing a motion detector, camera, circuit board, memory storing instructions, and processor configured to execute the instructions. The device may be as small as 1/60 the size of conventional camera traps. The instructions stored in the memory may include image recognition software, and the processor may be capable of executing the instructions to process captured images and identify a subject, such as a human being, animal, or vehicle in an image. Data regarding images captured by the device, including the images themselves, may be transferred over a network via a transmission unit. The transmission unit may be connected to the device over a cable connected to the circuit board of the device through the top of the housing. Power for the device may be supplied by a battery. The battery may be disposed in an enclosure that is separate from the device. The battery may be connected to the device over a cable connected to the circuit board of the device through the bottom of the device housing. The cables may be made to mimic vines, such that the system including the cables and the device appear to be a vine when connected.

When placed in the field, the device may be mounted to vegetation, such as a tree. The transmission unit may be mounted atop vegetation, such as at the top of a tree, to facilitate transmission and/or reception of data. The enclosed battery may be hidden in vegetation, on the ground, behind a tree, or buried underground, for example. When the system is set up in this fashion, the combination of the small size of the device and its camouflage appearance may result in the cables and device appearing to be a vine to a casual observer. Power-saving capabilities of the device, and the ability of the device to detect subjects in images on the device before transmitting data over a network, provides a long battery life for the system. As a result, the system's battery may have to be replaced infrequently as compared to conventional camera traps. With typical usage, the system's battery may last a year or more without needing replacement. The system may also utilize a transmission unit that uses a data transmission technology not dependent on cellular connectivity. As a result, data regarding captured images can be transmitted in near real-time to authorities responsible for monitoring an environment, which is not possible with conventional camera traps.

FIG. 1 illustrates an example view 100 of a system for capturing images. View 100 illustrates a device 180 for capturing images. Device 180 may include a housing 150. Housing 150 may be made from a plastic, metal, or fiberglass material, though the disclosure is not so limited. In one embodiment, housing 150 may be formed by molding melted plastic in a mold. For example, housing 150 may be formed by pouring an electronic encapsulating plastic into a mold, thus forming a solid unit impervious to weather. Housing 150 may be manufactured to be rugged for use outdoors. For example, housing 150 may be manufactured to be waterproof or substantially waterproof to extend the life of device 180.

Housing 150 may include one or more apertures for one or more components within housing 150. For example, as illustrated in view 100, an aperture 140 may be provided for a camera. In one embodiment, the camera may be a digital camera. The camera may be formed of a lens assembly having an aperture fitted with a lens and a shutter, and an image sensor configured to capture image data. When an image is to be captured, the shutter may briefly open. This may allow the lens to focus light onto the image sensor, such that the image sensor captures an image. Once captured, the image may be sent to a processor, such as microprocessor 510 described further herein, within device 180, which may process the image. In one embodiment, the camera may be a stereo camera that includes two or more lenses, and a separate image sensor for each lens. This may allow for capturing images with greater three-dimensional depth than can be captured with a conventional lens.

Device 180 may also include an aperture 130 for a motion detector. In one embodiment, the motion detector may be a passive infrared (PIR) motion detector. However, the disclosure is not so limited. The motion detector may detect motion using any type of motion sensor, such as a PIR motion sensor, a microwave motion sensor, an area reflective type motion sensor, an ultrasonic motion sensor, a vibration motion sensor, or any other type of motion sensor. In some embodiments, the motion detector could be a dual technology motion detector that combines multiple types of motion sensors, such as a PIR sensor and a microwave sensor.

Device 180 may further include an aperture 120 for an ambient light sensor. The ambient light sensor may be used to detect an amount of light in an environment. Information about the amount of light in the environment may then be used to adjust an exposure of the camera and/or to determine whether an illuminator should illuminate the environment when an image is captured so that the captured image is more clear.

Device 180 may still further include an aperture 110 for an illuminator. The illuminator may be used to illuminate the environment around device 180 when the camera is capturing an image, so that the image is more clear in dark conditions. In one embodiment, the illuminator may be an infrared illuminator. The illuminator may, for example, illuminate the environment with electromagnetic radiation having a wavelength in the near-infrared spectrum between 850 and 950 nanometers, so as to make it undetectable to humans. Alternatively, the illuminator may be a white light illuminator.

When manufacturing device 180, after the above components have been assembled inside of housing 150, device 180 may be dipped in an epoxy or polyurethane and then cured. In doing so, device 180 may be further weatherproofed and ruggedized for outdoor use.

View 100 also illustrates a cable 160 connecting to one or more components within device 180 through a top of housing 150, and a cable 170 connecting to one or more components within device 180 through a bottom of housing 150. Cable 160 and/or cable 170 may be electrical connectors for electrically connecting components within device 180 to components outside device 180. For example, cable 160 may connect components within device 180 to a transmission unit, and cable 170 may connect components within device 180 to a battery. Cable 160 and/or cable 170 may be an assembly of one or more wires used to carry electric current, such that electrical signals or power can be transferred along cable 160 and/or cable 170. The hole(s) through which cable 160 and/or cable 170 extend through the top or bottom of housing 150 may be sealed with a material, such as a polyurethane or epoxy, to weatherproof device 180 and prevent moisture, wind, or insects from entering housing 150.

As further illustrated in view 100, device 180, cable 160, and/or cable 170 may be colored or textured to blend in with the surrounding environment. For example, device 180, cable 160, and/or cable 170 may be colored brown, green, gray, or a mixture thereof to camouflage against the surrounding environment. In one embodiment, cable 160, cable 170, and/or device 180 may be further coated with a material that adds texture to give the appearance of a vine or tree bark, for example. The material could be, for example, a plastic or rubber material. Cable 160 and/or cable 170 may further branch in different places lengthwise, or twist radially lengthwise to further mimic a vine. In some embodiments, different electrical wires in cable 160 and/or cable 170 may be routed through the different branches of the cable. In other embodiments, the one or more electrical wires in cable 160 and/or cable 170 may be routed through one branch of the cable, and any additional branches may be added only to further add to the cable's appearance as a vine.

Figure 2:
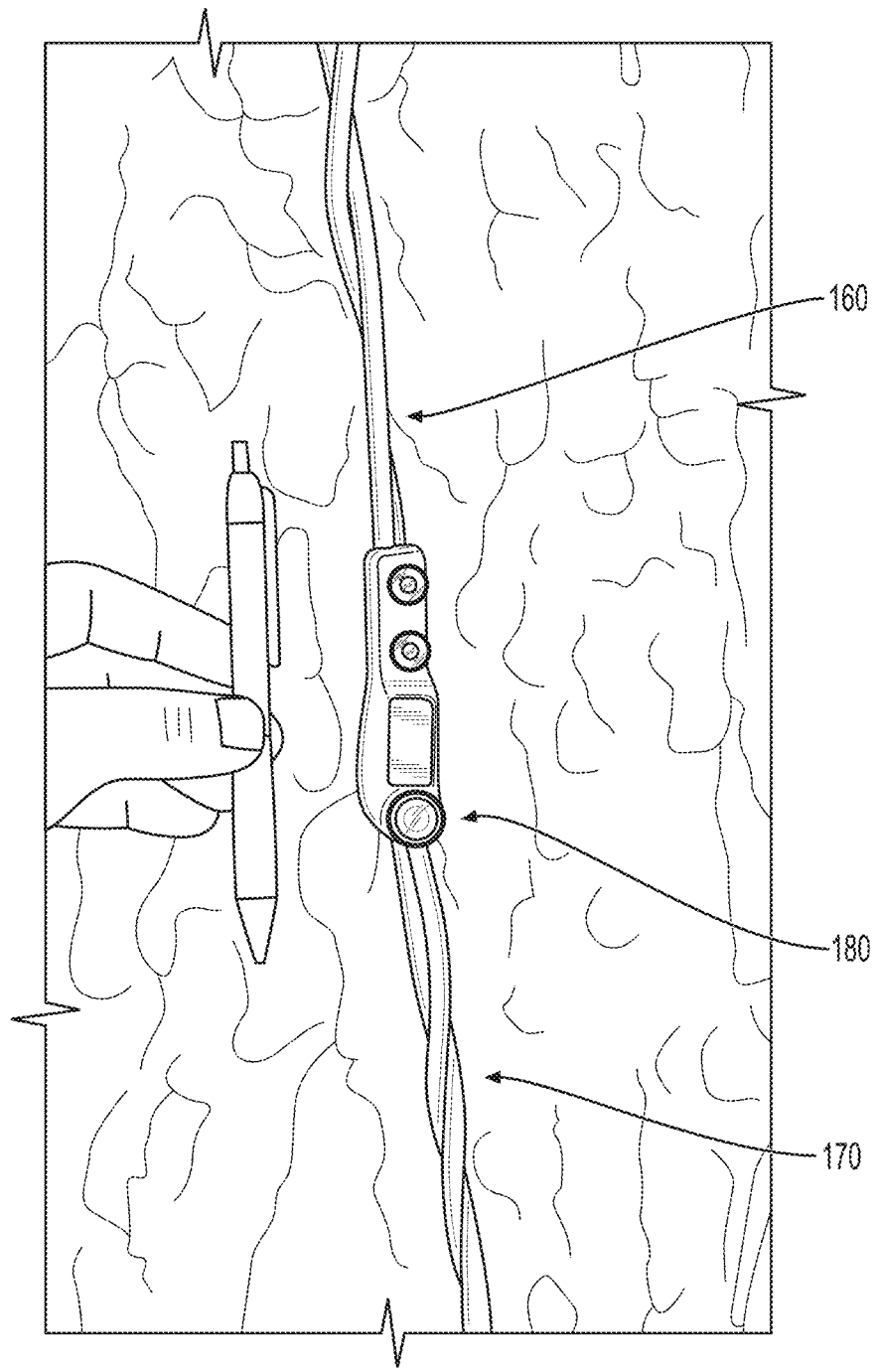
FIG. 2 illustrates another example view of a system for capturing images according to some embodiments of the present disclosure.

FIG. 2 illustrates another example view 200 of a system for capturing images. View 200 illustrates a view of device 180, cable 160, and cable 170 from a greater distance. In the example shown in view 200, cable 160 and cable 170 each branch into multiple cables and the multiple cables twist radially around one another lengthwise to further add to the system's appearance as a vine. View 200 further illustrates that device 180 may be small in size. The appearance of a person's fingers and a pen next to device 180 illustrate that device 180 may be have a similar width and depth to a typical pen, and may have less height than a typical pen. In some embodiments, device 180 may be less than 4.25 inches in height, less than 0.75 inches in width, and less than 0.75 inches in depth. Given the small size of device 180, and the camouflaging of device 180, cable 160, and cable 170, the system may appear as a vine to a casual observer without further inspection.

Figure 3:
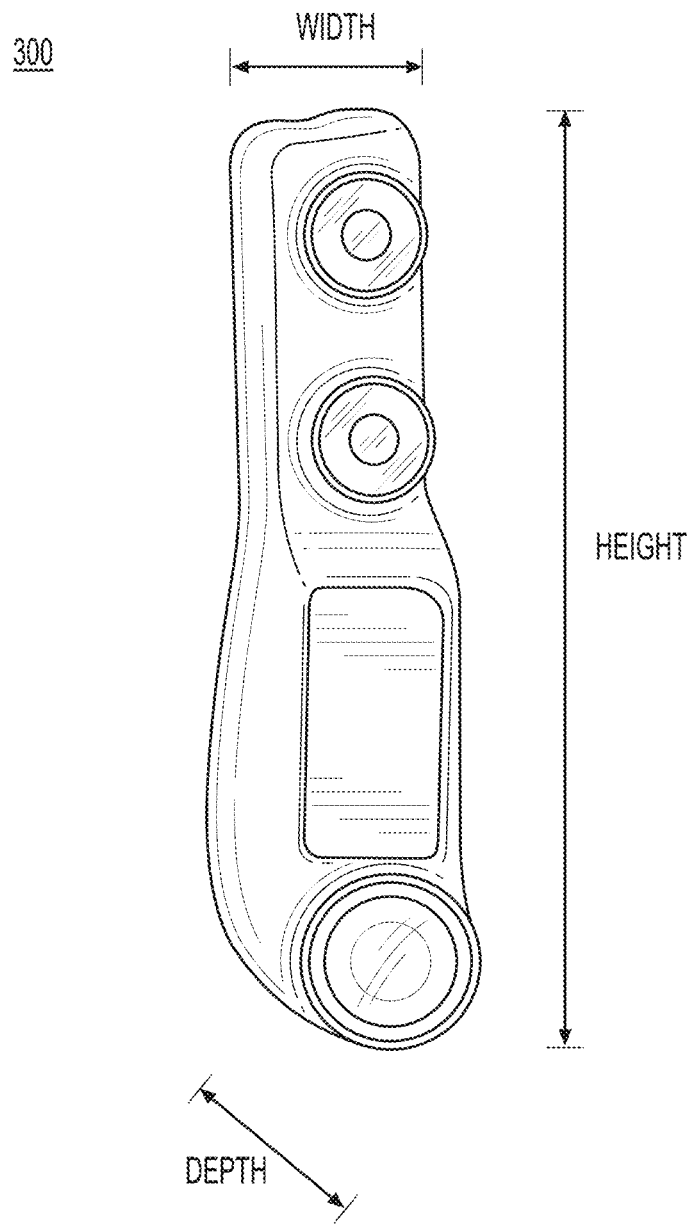
FIG. 3 illustrates an example view of a device, illustrating the height, width, and depth of the device according to some embodiments of the present disclosure.

FIG. 3 illustrates another example view 300 of device 180, illustrating the height, width, and depth of device 180. As discussed above, in one embodiment, device 180 may be less than 4.25 inches in height, less than 0.75 inches in width, and less than 0.75 inches in depth.

Figure 4:
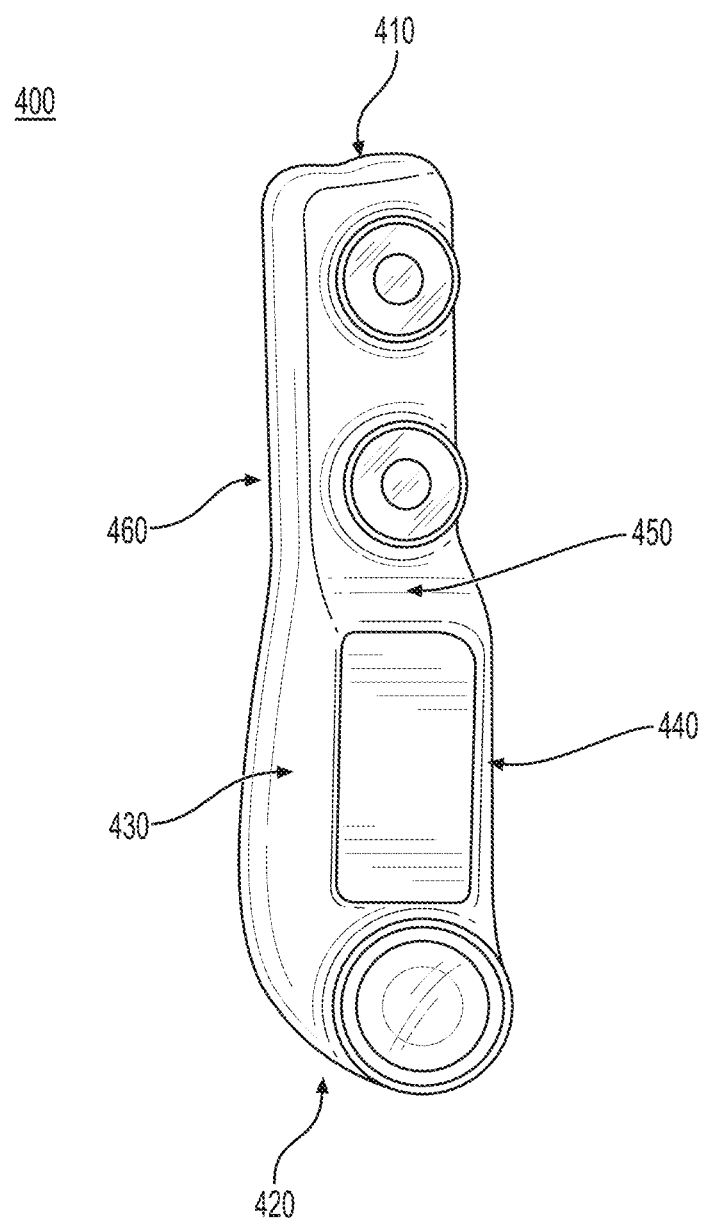
FIG. 4 illustrates another example view of a device according to some embodiments of the present disclosure.

FIG. 4 illustrates another example view 400 of device 180. As shown in view 400, housing 150 of device 180 may have a top 410, a bottom 420, a front 450, a rear 460, a left side 430, and a right side 440. As previously discussed, a cable, such as cable 160, may be connected to one or more components within housing 150, and may extend out top 410 of housing 150. As also previously discussed, a cable, such as cable 170, may be connected to one or more components within housing 150, and may extend out bottom 420 of housing 150.

Figure 5:
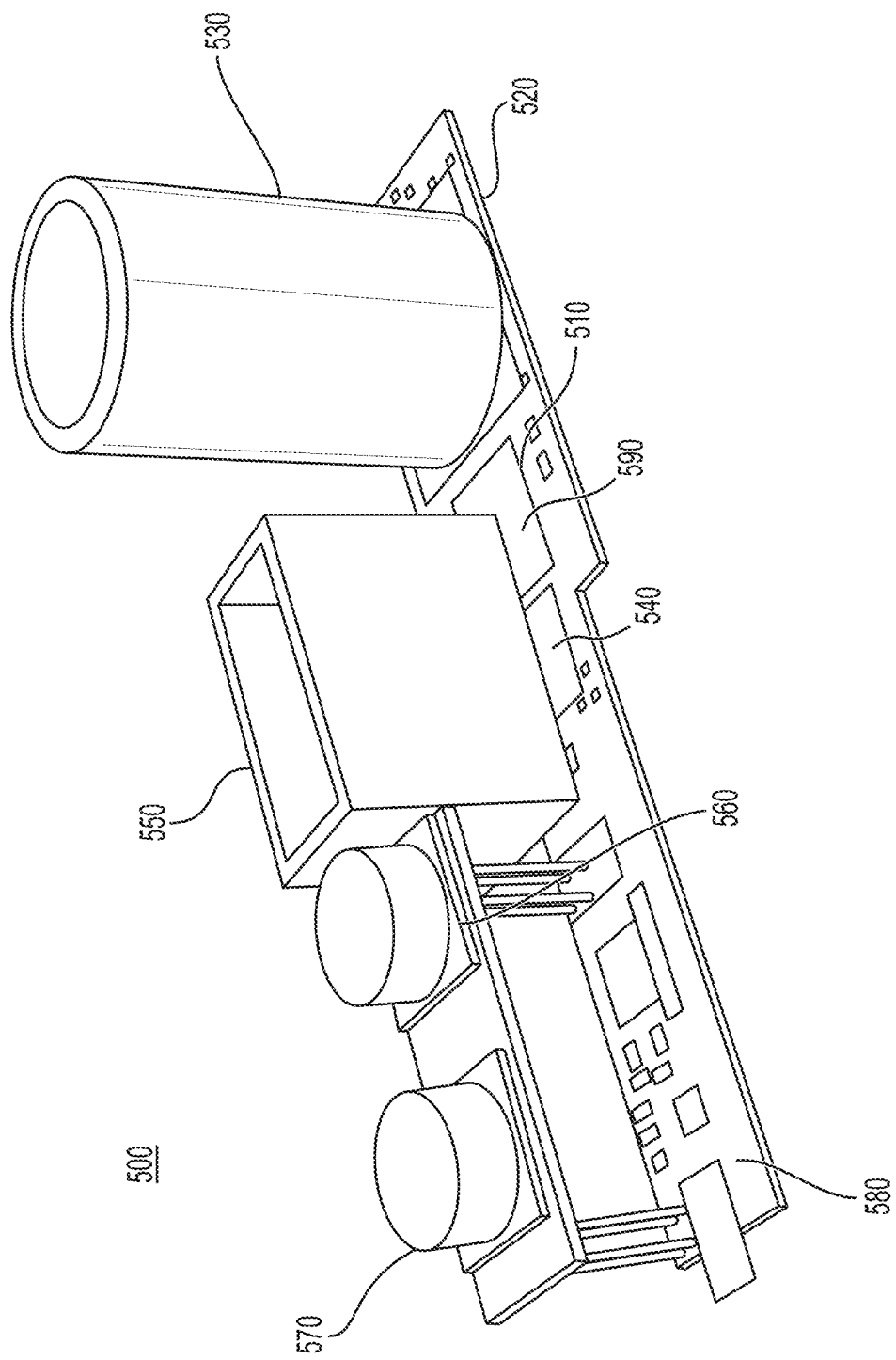
FIG. 5 illustrates an example view of example components inside of a housing of a device according to some embodiments of the present disclosure.

FIG. 5 illustrates an example view 500 of example components inside of housing 150. The arrangement and number of components illustrated in example view 500 is provided for purposes of illustration. Additional arrangements, number of components, and other modifications may be made, consistent with the present disclosure.

A circuit board 580 may be positioned inside housing 150 in proximity to rear 460 of housing 150. An image sensor 520 may be positioned on circuit board 580, and a lens assembly 530 may be positioned such that the image sensor 520 is inside of lens assembly 530. Image sensor 520 could be, for example, a charged coupled device (CCD) image sensor or a complementary metal-oxide semiconductor (CMOS) image sensor. Lens assembly 530 may project out of housing 150 through aperture 140, as illustrated in view 100 of FIG. 1. A lens and shutter may be positioned at an opposite end of lens assembly 530 from image sensor 520. The lens, shutter, lens assembly 530, and image sensor 520 together may comprise a camera. In one embodiment, the camera may be a stereo camera that includes two or more lenses, and a separate image sensor for each lens. This may allow for capturing images with greater three-dimensional depth. In other embodiments, the camera may include a conventional lens, wide angle lens, flat lens, or any other type of lens. The camera may be capable of capturing images in daylight or in low-light conditions, such as at night.

Cable 170 may connect to circuit board 580 at the end of circuit board 580 where lens assembly 530 is positioned. Cable 160 may connect to circuit board 580 at the end of circuit board 580 where illuminator 570 is positioned.

Example view 500 also illustrates a motion detector 540. In one embodiment, motion detector 540 may be, for example, a passive infrared (PIR) motion sensor. The motion detector may detect motion using any type of motion sensor, such as a PIR motion sensor, a microwave motion sensor, an area reflective type motion sensor, an ultrasonic motion sensor, a vibration motion sensor, or any other type of motion sensor. In some embodiments, the motion detector could be a dual technology motion detector that combines multiple types of motion sensors, such as a PIR sensor and a microwave sensor. Motion detector 540 may be positioned within a motion detector housing, such as PIR housing 550, which extends from circuit board 580 through aperture 130 of housing 150. Motion detector 540 may be configured to detect movement within a field of view of motion detector 540.

Example view 500 further illustrates an ambient light sensor 560. Ambient light sensor 560 may be configured to detect an amount of ambient light in an environment around device 180. Information about the amount of ambient light detected by ambient light sensor 560 may then be used to adjust an exposure of the camera, or to determine whether to illuminate the environment when capturing an image.

Example view 500 still further illustrates an illuminator 570. In one embodiment, illuminator may be an infrared (IR) illuminator. The IR illuminator may illuminate the environment with electromagnetic radiation having a wavelength in the near-infrared spectrum between 850 and 950 nanometers, for example. Illuminating the environment at a wavelength within this range may provide sufficient illumination to capture clear images in dark conditions, while minimizing the likelihood that a human or animal in the vicinity would notice the illumination. For example, unless the environment were repeatedly illuminated and a human or animal were looking in the direction of device 180, a human or animal would be highly unlikely to notice the illumination. Alternatively, illuminator 570 may be a white light illuminator.

Example view 500 also illustrates a memory 590 and a processor 510, such as a microprocessor. Memory 590 may include any combination of one or more NOR flash memory devices, NAND flash memory devices, read only memory (ROM) devices, random access memory (RAM) devices, or any other memory device. Memory 590 may be configured to store instructions for execution by processor 510. Memory 590 may also be configured to store one or more captured images, and data about one or more captured images. Memory 590 may further be configured to store image recognition software. In one embodiment, memory 590 may be configured to store one or more software models used to identify humans and/or to identify various species of animals. Instructions within memory 590 may be updated by connecting a computing device with device 180 via a connector and receiving a software update via the connector, or by receiving a software update over-the-air via transmission unit 708.

Processor 510 may be configured to execute the instructions stored in memory 590. In one embodiment, processor 510 may include multiple processor cores. In one embodiment, processor 510 may be implemented as a system-on-a-chip (SoC). In one embodiment, processor 510 may be the Movidius® Myriad® 2 Vision Processor. Processor 510 may be configured to operate in a power-saving mode when processor 510 is not required to process an image. For example, processor 510 may wake from a power-saving mode when motion has been detected by motion detector 540, or when an image has been captured by the camera. Processor 510 may then receive the captured image from the camera, and may process the image to determine whether a subject, such as a human, an animal species, or a vehicle, is present in the image. If the subject is present in the image, processor 510 may transmit data, such as the image itself, to a transmission unit for sending over a communication network. If the subject is not present in the image, processor 510 may ignore the image. Once the image has been transmitted or ignored, processor 510 may return to the power-saving mode. Alternatively, if the subject was present in the image, processor 510 may be configured to wait a predetermined period of time, such as 5 minutes, before returning to the power-saving mode, because the subject might still be in the vicinity and additional images may be captured.

Figure 6:
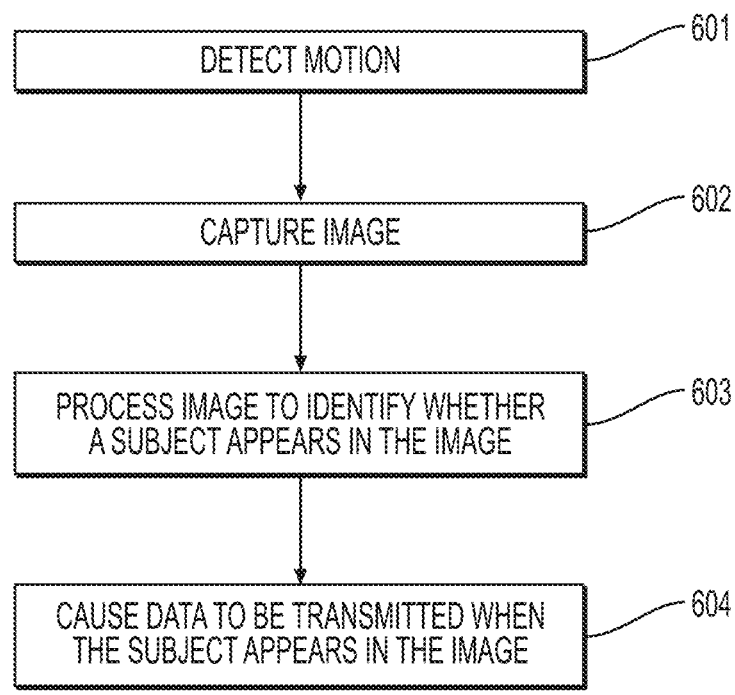
FIG. 6 illustrates an example flowchart of a method according to some embodiments of the present disclosure.

FIG. 6 illustrates an example flowchart of a method 600 that may be used in carrying out embodiments of the present disclosure. Example method 600 may be implemented by a device, such as device 180.

In step 601, motion may be detected by a motion detector. For example, the motion could be detected by motion detector 540 of device 180, such as a passive infrared (PIR) motion detector. Motion could be detected as a result of, for example, a human moving in the area, an animal moving in the area, foliage or dust blowing in the wind, or a change in ambient lighting. When motion is detected, the motion detector may instruct the shutter of the camera to open so that an image is captured. Alternatively, the motion detector may send information to a processor, such as processor 510, indicating that motion has been detected, and processor 510 may instruct the shutter of the camera to open so that an image is captured. In step 602, an image may be captured. For example, one or more image sensors, such as image sensor 520, may capture the image when the shutter opens. Once the image has been captured, the image may be sent to a processor, such as processor 510.

In step 603, processor 510 may process the image. For example, processor 510 may execute instructions stored in memory 590 to detect whether a subject, such as a human, an animal species, or a vehicle is present in the image. If the subject is present in the image, in step 604 processor 510 may transmit data to a transmission unit for sending over a communication network. The data may include, for example, one or more of the image itself, a compressed version of the image, a timestamp indicating when the image was captured, a date indicating the date on which the image was captured, a location of device 180, or any other information related to the image.

In one embodiment, the data may include a direction the subject was traveling. For example, processor 510 may execute instructions stored in memory 590 to detect whether subject is likely moving in a particular direction. In another embodiment, the camera may take a sequence of images, and processor 510 may execute instructions stored in memory 590 to process the sequence of images and determine a direction of travel of the subject based on the relative position of the subject in the images over time.

The data may also include additional information about the environment in which the image was captured. For example, device 180 could include one or more additional sensors for measuring weather information, such as temperature or humidity, and this information could be transmitted with the data. The data may also include information about the system itself, such as an amount of battery life remaining in the system. If the subject is not present in the image, processor 510 may ignore the image. For example, the image may be discarded.

After the data has been transmitted or the image has been ignored, device 180 may exit method 600. Device 180 may execute method 600 again when motion is again detected in step 601.

Figure 7:
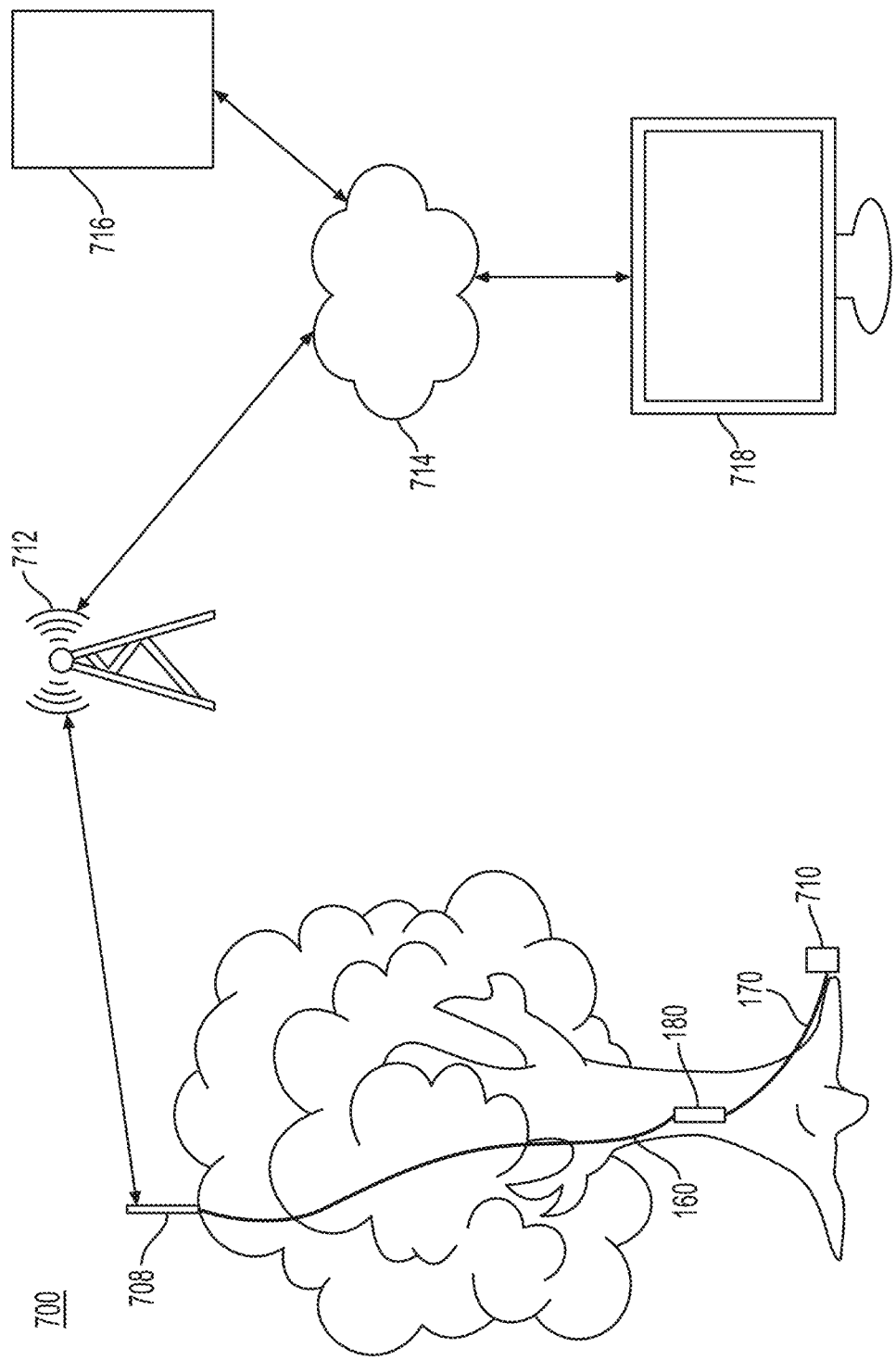
FIG. 7 illustrates example diagram of a system according to some embodiments of the present disclosure.

FIG. 7 illustrates an example diagram of a system 700 for implementing embodiments of the present disclosure. The arrangement and number of components in system 700 is provided for purposes of illustration. Additional arrangements, number of components, and other modifications may be made, consistent with the present disclosure.

As shown in FIG. 7, system 700 may include a device 180, a transmission unit 708, a battery pack 710, a cable 160 connecting device 180 to transmission unit 708, and a cable 170 connecting device 180 to battery pack 710. Device 180 may be, for example, a device 180 as described with respect to any of FIGS. 1-6. Cable 160 may be a cable as described with respect to any of FIGS. 1-6. Cable 170 may also be a cable as described in any of FIGS. 1-6.

FIG. 7 illustrates an example of a field installation of device 180, transmission unit 708, battery pack 710, cable 160, and cable 170. In this example, device 180, transmission unit 708, battery pack 710, cable 160, and cable 170 are installed in the environment of a tree. For example, device 180 may be mounted to a tree trunk, transmission unit 708 may be placed in a tree top, and battery pack 710 may be hidden behind a tree or buried underground in the vicinity of a tree. A person of ordinary skill in the art will recognize that there are many ways to mount device 180 to a tree trunk. For example, device 180 may be nailed, screwed, or bolted to a tree trunk, adhered to a tree trunk with an adhesive, and/or bound to a tree trunk with string, twine, or rope. Device 180 may be lightweight, such that nailing, adhering, or binding cable 160 and/or cable 170 to the tree trunk is sufficient to hold device 180 in place. Transmission unit 708 may similarly be nailed, adhered, and/or bound to a branch in the tree top. Although FIG. 7 illustrates installation in the environment of a tree, the disclosure is not so limited. A person of ordinary skill in the art will recognize that there are many ways to install the above components in the field. For example, these components may be installed in a bush, in shrubbery, near vines or branches, or on a pole, building, or wall.

Device 180, cable 160, cable 170, transmission unit 708, and/or battery pack 710 may be colored or textured with material to blend in with the environment surrounding the installation. For example, when installed near a tree, device 180 may be colored brown, green, or gray to blend with a tree trunk. Similarly, cable 160 and/or cable 170 may be colored brown, green, or gray. Cable 160, cable 170, and/or device 180 may also be textured with material, such as a plastic or rubber, to have the appearance of a vine. Cable 160 and/or cable 170 may twist radially in a lengthwise direction, and/or may fork into multiple cables, to further the appearance of a vine. Transmission unit 708 may be colored green to blend in with a tree top. Battery pack 710 may be colored green, gray, brown, or black to blend in with a tree, shrubbery, foliage, or the ground. Battery pack 710 could also be shaped or textured to appear as something in nature, such as a rock. A person of ordinary skill in the art would recognize that device 180, cable 160, cable 170, transmission unit 708, and/or battery pack 710 could be manufactured with a variety of colors in a camouflage pattern, so as to blend in with the environment. In the example illustrated in FIG. 7, device 180, cable 160, and cable 170 may appear to be a vine to a casual observer.

Battery pack 710 may include an enclosure, a battery within the enclosure, and an opening in the enclosure through which cable 170 may be connected to the battery. The battery may be, for example, a lithium ion battery, a nickel metal hydride (NiMH) battery, an alkaline battery, or a lead acid battery, though the disclosure is not so limited. Cable 160 and/or cable 170 may include one or more electrical conduits for conveying electricity.

Transmission unit 708 may include components for transmitting and/or receiving data, such as images. Transmission unit 708 may include, for example, a modem for modulating and demodulating signals, and an antenna configured to transmit modulated signals to and/or receive modulated signals from, one or more gateways 712. Such data signals may be communicated via a radio frequency network. For example, the data signals could be communicated over a cellular network, such as a Global System for Mobile (GSM) communication network, a General Packet Radio Service (GPRS) network, a Code Division Multiple Access (CDMA) network, an Enhanced Data for Global Evolution (EDGE) network, a Long Term Evolution (LTE) network, or any other type of cellular network. The data communications could alternatively be over a satellite network. The data communications could alternatively be over a shorter distance network, such as a Wi-Fi, Bluetooth, or infrared network. In one embodiment, the transmission unit may be configured to send and/or receive data communications using Long Range (LoRa) or LoRaWAN technology. By using LoRA or LoRaWAN technology, data may be communicated long distances, such as 30 kilometers, even in remote locations where cellular network coverage is unreliable or nonexistent. In another embodiment, the data communications could be over an optical network where light is modulated for wireless transmission. In still another embodiment, transmission unit 708 may be configured to transmit and/or receive data over a variety of networks. For example, transmission unit 708 could be configured to transmit over one or more different types of cellular networks, satellite networks, short distance networks, LoRa networks, or optical networks, and may select a network technology to use for a data communication based on availability. In some embodiments, transmission unit 708 may be configured to receive software updates from server(s) 716 via network(s) 714 and gateway(s) 712, and to convey those software updates to device 180 for updating memory 590 in device 180.

In some embodiments, the battery and/or transmission unit may be integrated into device 180. In these embodiments, a battery 710 and/or transmission unit 708 separate from device 180 may not be required. Additionally, in these embodiments, cable 160 and/or cable 170 may not need to conduct electricity. As a result, cable 160 and/or cable 170 may simply be a material, such as plastic or rubber, to convey the appearance of vine.

System 700 may also include one or more gateways 712. Gateway(s) 712 may be configured to receive and/or transmit data communications from/to transmission unit 708. Gateway(s) 712 may be, for example, a gateway 712 configured to provide connectivity using a radio frequency technology. For example, gateway(s) 712 may be configured to provide connectivity using cellular technology, such as GSM, GPRS, CDMA, EDGE, LTE, or any other type of cellular technology. Gateway(s) 712 could alternatively provide connectivity over a satellite network. Gateway(s) 712 could alternatively provide connectivity over a shorter distance networking technology, such as a Wi-Fi, Bluetooth, or infrared networking technology. In one embodiment, gateway(s) 712 may be configured to provide connectivity using Long Range (LoRa) or LoRaWAN technology. In another embodiment, gateway(s) 712 could provide connectivity using optical transmission technology, where light is modulated for wireless transmission. In still another embodiment, gateway(s) 712 may be configured to provide connectivity by a variety of different networking technologies. For example, gateway(s) 712 could be configured to provide connectivity over one or more different types of cellular networks, satellite networks, short distance networks, LoRa networks, or optical networks. In some embodiments a gateway 712 may be configured to communicate with several devices 180 in the field.

System 700 may also include one or more networks 714. In one embodiment, network(s) 714 may include one or more personal area networks (PANs), local area networks (LANs), metropolitan area networks (MANs), or wide area networks (WANs), or any combination of these networks, though the disclosure is not so limited. Network(s) 714 may include one type of network, or a combination of different types of networks, including Ethernet, intranet, twisted-pair, coaxial cable, fiber optic, cellular, satellite, IEEE 802.11, WiFi, terrestrial, Internet, and/or other types of wired or wireless networks.

System 700 may further include one or more servers 716. A server 716 may be a standalone computer system or apparatus, or it may be part of a larger system. For example, server(s) 716 may represent distributed servers that are remotely located and communicate over a communications network, such as a LAN. Server(s) 716 may include one or more back-end servers for carrying out one or more aspects of the present disclosure. Server(s) 716 may include one or more computing systems, such as one or more servers, web servers, application servers, database servers, personal computers, laptop computers, or any other type of computing device.

System 700 may still further include one or more clients 718. A client 718 could be a personal computer, desktop computer, laptop computer, mobile computer, mobile phone, smart phone, tablet computer, netbook, personal digital assistant (PDA), wearable computer, smart watch, television, portable electronic device, server, and/or any other type of computing device. In some embodiments, a client 718 may be implemented with hardware devices and/or software applications running thereon.

In some embodiments, device 180 may cause data about one or more captured images to be transferred in near real-time. The data may be transmitted via transmission unit 708 to gateway(s) 712. Gateway(s) 712 may then transmit the data via one or more networks 714 to one or more servers 716. In one embodiment, the transmitted data may include the one or more images themselves, or compressed versions of the one or more images, and the one or more servers 716 may perform additional image processing on the one or more images to further determine whether a subject may be present in the one or more images. For example, processor 510 on device 180 may determine a certain likelihood that a subject appears in an image, such as a 75% probability that a subject appears in the image. Based on that likelihood, processor 510 may transmit the image to server(s) 716. Server(s) 716 may then further process the image with more robust software models and additional processing capability to determine a greater likelihood that a subject appears in the image, such as a 98% probability that a subject appears in the image.

In some embodiments, when it is determined that a subject is likely to appear in an image, server(s) 716 may transmit data over one or more networks 714 to one or more clients 718. For example, the data may be an alert that indicates that a person or animal species has been detected in an image. In one embodiment, the data may include the image itself, or a compressed version of the image. The data could be sent in the form of a short message service (SMS) message that appears on a client 714, such as a mobile phone. In some embodiments, the data may be transmitted to a domain awareness system (DAS) maintained by a response team. A member of the response team, such as a law enforcement officer, can then view the data and respond appropriately, such as by deploying officers in the field to confront the human or animal captured in the image(s). In some embodiments, server(s) 716 may be omitted, and data may be transmitted directly from device 180 via transmission unit 708, gateway(s) 712, and network(s) 714 to client(s) 718.

Embodiments of the present disclosure can address the challenges associated with monitoring areas where conflict between humans and animals is prevalent. Embodiments of the present disclosure can also address the shortcomings of camera traps. The small size of the system and its camouflaging make the system hard to identify to casual observers. Moreover, the fact the device is capable of entering power-saving modes, and only sends data regarding captured images when a subject is likely present in an image, provides for a much longer battery life than conventional camera traps.

Embodiments of the systems and methods disclosed herein can be used, for example, to monitor areas where poaching is prevalent. For example, the system, including device 180, cable 160, cable 170, transmission unit 708, and/or battery pack 710, can be installed in an area where poaching is prevalent. When a poacher enters the field of view of the motion detector of device 180, an image of the poacher can be captured, and data can be transmitted to a client 718 associated with a response team. Members of the response team can then respond to the area where the image was captured to respond to the illegal activity.

Embodiments of the systems and methods disclosed herein can also be used, for example, to monitor areas where animals pose risks to humans. For example, the system, including device 180, cable 160, cable 170, transmission unit 708, and/or battery pack 710, can be installed in an area where animals pose risk to humans, such as near a village or near a pasture where livestock roam. When an animal of a particular species, such as a lion, enters the field of view of the motion detector of device 180, an image of the animal can be captured, and data can be transmitted to a client 718 associated with a response team. Members of the response team can then respond to the area where the image was captured to capture the animal or otherwise prevent conflict between the animal and the human or the human's livestock.

Embodiments of the systems and methods disclosed herein can also be used, for example, for wildlife monitoring. For example, individuals, such as researchers or hunters, can install the system, including device 180, cable 160, cable 170, transmission unit 708, and/or battery pack 710 in an area they would like to monitor for a particular animal species. When an animal of the particular species is identified, data, such as an alert or an image of the animal itself, can be sent to a client 718 associated with the individual to inform the individual of the animal's presence.

A person of ordinary skill in the art will recognize that there are many additional possible uses for the systems and methods disclosed herein. For example, the system, including device 180, cable 160, cable 170, transmission unit 708, and/or battery pack 710, could be installed near roads or routes traveled by humans to monitor areas where illegal activity, such as illegal logging or mining, may be occurring. In such an installation, device 180 may be configured to process captured images to identify vehicles loaded with logs or minerals and, when these vehicles are identified, to capture license plates of the vehicles. Data, such as an image of the vehicle and an image of the vehicle's license plate, could then be sent to a client 718 associated with a response team. Members of the response team could then report the vehicle to the appropriate law enforcement authorities.

Although the above disclosure discusses use of the systems and methods disclosed herein for capturing images, the disclosure is not so limited. The systems and methods disclosed herein could also be used, for example, to capture short videos. For example, when motion detector 540 detects motion, a short video could be captured by the camera and then processed by processor 510 to determine whether a subject likely appears in the video. If a subject likely appears in the video, processor 510 may cause data, which may include the video itself, to be transmitted via transmission unit 708 to server(s) 716 and/or client(s) 718 via one or more gateway(s) 712 and network(s) 714.

Additionally, the systems and methods disclosed herein could also be used, for example, to capture audio samples. For example, device 180 may include a sensor for capturing sound, such as a microphone. If a sound is detected, audio may be captured by the sensor and then processed by the microphone. If a particular sound likely is present in the audio, such as a particular bird, insect, or amphibian sound, processor 510 may cause data, which may include the audio itself, to be transmitted via transmission unit 708 to server(s) 716 and/or client(s) 718 via one or more gateway(s) 712 and network(s) 714.

The subject matter disclosed herein can be implemented in digital electronic circuitry, or in computer software, firmware, or hardware, including the structural means disclosed in this specification and structural equivalents thereof, or in combination of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of computer programs include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, certain computers might also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices (e.g., EPROM, EEPROM, and flash memory devices), magnetic disks (e.g., internal hard disks or removable disks); magneto optical disks; and optical disks (e.g., CD and DVD disks). The processor and the memory can be supplemented by, or incorporated in, special purpose logic circuitry.

To provide for interaction with a user, some subject matter described herein can be implemented on a computer having a display device, e.g., a CRT (cathode ray tube) or LCD (liquid crystal display) monitor, for displaying information to the user, and a keyboard and a pointing device (e.g., a mouse, trackball, touchscreen), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Some subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or a combination of such back end, middleware, and front end components. The components of the system can be interconnected by any form of medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A system for capturing images, comprising:
a device, comprising:
 a housing having a camouflage appearance, a top, a bottom, a front, a rear, and two sides, the housing having a greater length from the top to the bottom than from the front to the rear or between the two sides;
 a motion detector disposed within the housing;
 a camera disposed within the housing;
 a circuit board disposed within the housing;
 a memory disposed within the housing storing instructions and image recognition software; and
 a processor disposed within the housing configured to execute the instructions and image recognition software;
a first cable connected to the circuit board and extending through the top of the housing;
a second cable connected to the circuit board and extending through the bottom of the housing; and
at least one of the first cable or the second cable mimicking a vine in color and appearance.

2. The system of claim 1, further comprising:
a transmission unit connected to the circuit board via the first cable; and
a battery connected to the circuit board via the second cable.

3. The system of claim 1, wherein at least one of the first cable or the second cable is coated with a material and colored to mimic a vine, wherein the material comprises one or more of an epoxy, a polyurethane, a plastic, or a rubber.

4. The system of claim 1, wherein the device is no greater than 0.75 inches wide, is no greater than 0.75 inches deep, and is no greater than 4.25 inches in height.

5. The system of claim 1, wherein the camera is configured to capture an image when motion is detected in a field of view of the motion detector, the instructions stored in the memory include image recognition software, and the processor is configured to execute the instructions to process the image and identify whether a subject appears in the image.

6. The system of claim 2, wherein the camera is configured to capture an image when motion is detected in a field of view of the motion detector, the instructions stored in the memory include image recognition software, and the processor is configured to execute the instructions to:
process the image and identify whether a subject appears in the image;
transmit data to the transmission unit over the first cable when the subject is identified as appearing in the image; and
cause the transmission unit to transmit the data to a server over a network via a gateway.

7. The system of claim 6, wherein the data includes the image.

8. The system of claim 6, wherein the data includes an alert.

9. The system of claim 6, wherein the subject is one of a human, an animal of a particular species, or a vehicle.

10. The system of claim 6, wherein the processor is further configured to execute the instructions to wake from a power-saving sleep mode when the motion is detected.

11. The system of claim 6, wherein the processor is further configured to execute the instructions to return to the power-saving sleep mode when the transmission unit has transmitted the data.

12. The system of claim 6, wherein the data includes information regarding at least one of a time that the image was captured, a date that the image was captured, a location at which the image was captured, or a direction in which the subject was moving.

13. The system of claim 6, wherein the data is transmitted over a Global System for Mobile (GSM) communication network, a network that uses Long Range (LoRa) digital wireless communication technology, or a satellite network.

14. The system of claim 1, wherein the motion detector is a passive infrared (PIR) motion detector.

15. The system of claim 1, wherein the device further comprises:
an ambient light sensor disposed within the housing; and
an infrared illuminator disposed within the housing.

16. The system of claim 15, wherein the infrared illuminator illuminates an environment with electromagnetic radiation having a wavelength in the near-infrared spectrum between 850 and 950 nanometers.

17. The system of claim 6, wherein the server provides the data for display on a screen associated with at least one member of a response team.

18. A method for capturing images, comprising:
detecting, by a motion detector disposed within a housing having a camouflage appearance, a top, a bottom, a front, a rear, and two sides, the housing having a greater length from the top to the bottom than from the front to the rear or between the two sides, motion in a field of view of the motion detector;
capturing, by a camera disposed within the housing, an image when the motion detector detects the motion; and
processing, by a processor disposed within the housing, the image to identify, by image recognition software, whether a subject appears in the image.

19. The method of claim 18, further comprising transmitting, by the processor, data to a transmission unit over a first cable when the subject appears in the image, the first cable extending outside of the housing and being coated with a material and colored to mimic a vine, wherein the material comprises one or more of an epoxy, a polyurethane, a plastic, or a rubber to mimic a vine.

20. The method of claim 19, wherein the data includes the image.

* * * * *